Sept. 1, 1959  J. H. HEDGER ET AL  2,902,607
RESISTIVE INTERPOLATING FUNCTION GENERATOR
Filed March 14, 1955  2 Sheets-Sheet 1
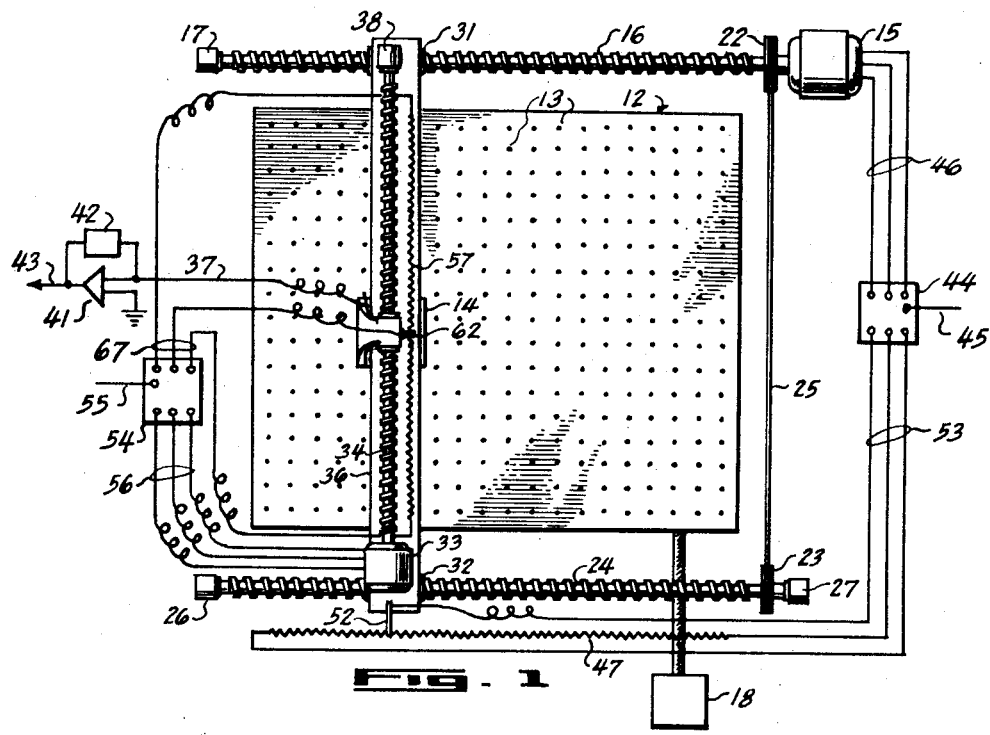
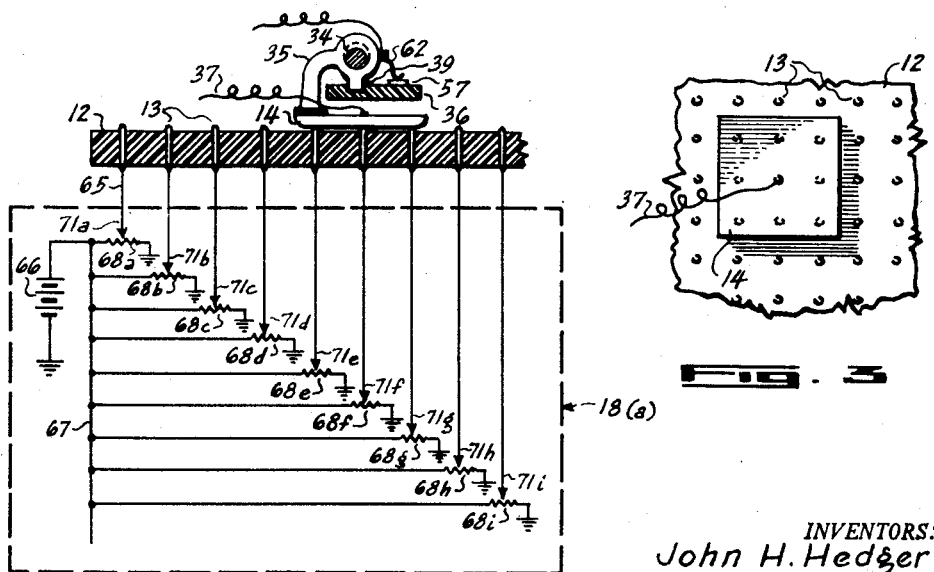
INVENTORS:
John H. Hedger &
BY Robert A. Westerwick
ATTORNEY Sept. 1, 1959    J. H. HEDGER ET AL    2,902,607
RESISTIVE INTERPOLATING FUNCTION GENERATOR
Filed March 14, 1955    2 Sheets-Sheet 2
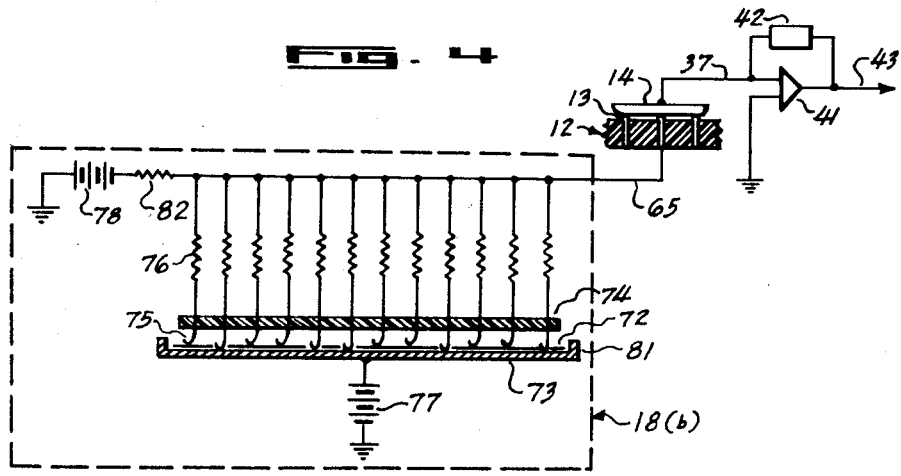
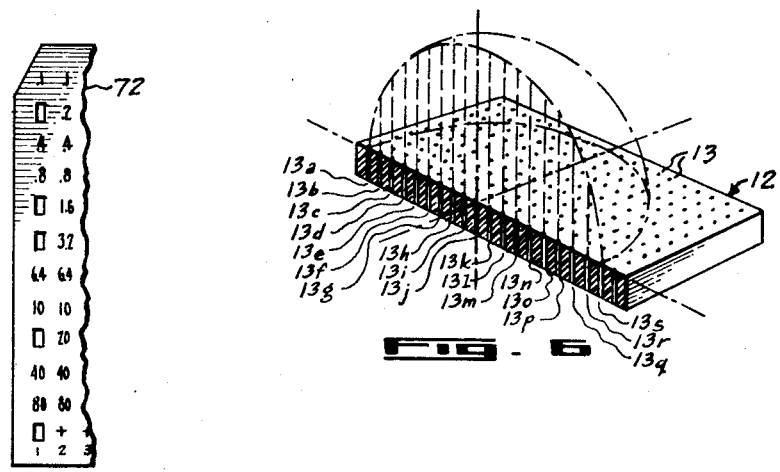
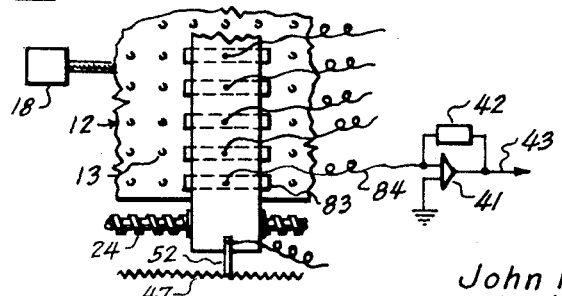
INVENTORS:
John H. Hedger &
BY Robert A. Westerwick
ATTORNEY United States Patent Office 2,902,607
Patented Sept. 1, 1959

2,902,607

RESISTIVE INTERPOLATING FUNCTION GENERATOR

John H. Hedger, Lakeside, and Robert A. Westerwick, San Diego, Calif., assignors to General Dynamics Corporation, San Diego, Calif., a corporation of Delaware Application March 14, 1955, Serial No. 494,194

11 Claims. (Cl. 307—43)

This invention relates to electrical signal generators, and more particularly to an electrical signal generator presenting a continuous output signal voltage closely representing an arbitrary function of two independent input variables. In addition, in another aspect of this invention, a plurality of independent functions of one variable may be generated simultaneously.

Heretofore, apparatus for generating signal voltages representing arbitrary functions of two independent input signals have been limited to electro-optical and cathode ray tube techniques. Electro-optical means of generating such signal voltages may consist of deflecting a narrow light beam along two mutually perpendicular axes by means of two mirror galvanometers, each deflected by an individual electric current proportional to two instantaneous variables of a function. An optical filter so constructed that the density thereof varies as a function of two variables, one directed along the $x$ axis, the other directed along the $y$ axis, is placed in the path of the light beam whereby the deflection axes of the galvanometers coincide with the axes of the function-representing variable density filter. A photo-sensitive device, such as a photo-electric cell, provides an output voltage proportional to the quantity of light flux transmitted through the particular portion of said variable density filter selected by the currents furnished to said galvanometers.

In the substantially similar cathode-ray tube system for generating a signal voltage which represents an arbitrary function of two independent variables, the electron beam of the cathode ray tube is deflected along two mutually perpendicular axes by means of voltages representing variables of $x$ and $y$ applied to the deflecting plates. A variable density optical filter, similar to that generally described hereinabove, wherein the density varies along two mutually perpendicular axes as an arbitrary function of two variables, is placed over the face of the cathode-ray tube. The light spot formed on the face of the cathode-ray tube by the electron beam is transmitted through the portion of the filter selected by voltages representing the $x$ and $y$ variables applied to the deflecting plates. The resultant varying light flux is translated by a suitable photo-sensitive device into an output voltage signal representing the desired arbitrary function of two variables which are determined by the density pattern of the filter at the face of the cathode ray tube.

As will be readily apparent, such prior art function generating systems employing variable-density filters are of limited accuracy and convenience. The preparation of variable-density filters simulating an arbitrary function of $x$ and $y$ is a slow and laborious manual task, and the attainable accuracy is low. Both positive and negative values of a function of two variables cannot be simulated simultaneously. Moreover, any minor changes desired in the function to be simulated, such as merely changing a constant term of the function, requires the preparation of an entirely new filter.

There are various means known to the art for generating voltages representing functions of a single variable. One such generator includes an opaque mask with an edge cut to outline the shape of the function to be simulated. Such masks are placed in such a manner as to cover a portion of the face of a cathode-ray tube. Photo-electric or electronic feedback circuits force the electron beam to follow the function-representing curve cut on one edge of the mask. Thus, the feedback signal voltage closely follows the function represented by the shape of the mask. Other forms of curve followers are known in the art, such as those photo-electrically following a line drawn on a suitable contrasting sheet material. Potentiometers having a resistance varying as a desired function of rotation are also known to the art. However, it will be apparent that all of these prior art devices are capable of generating a signal voltage representing only one function of a single variable at one time. In order to enable a plurality of function-representing signals to be generated simultaneously, a plurality of these prior art signal generators, one for each function to be generated, are necessary. In contrast, a simple modification of this invention, disclosed hereinbelow, enables the simultaneous presentation of a plurality of signal voltages, each representing an independent function of one variable, utilizing the apparatus also adapted to furnish a signal voltage representing a function of two independent variables.

Many of the limitations inherent in such generators of arbitrary functions of two variables as are known in the art are overcome by the present invention. An arbitrary signal generator constructed according to the principles of the present invention will generate a voltage representing any single-valued arbitrary function of two variables to a high degree of accuracy. By using discrete voltage-carrying conductive elements to represent the function value of each point representing a specific desired combination of $x$ and $y$, variations in the function represented may be accomplished easily and quickly merely by varying voltages. In one embodiment of this invention, the operator may vary the parameters experimentally during the course of operation of this invention in order to determine an optimum function of $x$ and $y$. Both positive and negative portions of a single-valued function may be simulated simultaneously.

On the other hand, means are additionally disclosed herein whereby frequently used functions may be recorded on punched cards, thereby allowing the voltage pattern for such functions to be set up instantly. In a second embodiment of this invention, means are disclosed for generating a plurality of signal voltages simultaneously, each of said signal voltages representing an independent function of one variable.

Accordingly, it is an object of this invention to provide a new and improved arbitrary function generator which overcomes the limitations of the prior art and introduces many advantages.

An object of this invention is to provide a novel signal generator capable of supplying an output voltage representing an arbitrary, single-valued function of two independent variables.

Another object of this invention is to provide a novel function generator capable of simultaneously furnishing both positive and negative values of an arbitrary function of two variables.

A further object of this invention is to provide a novel function generator which will receive electrical values representing two variables of a function and generate an output voltage representing an arbitrary function of said two variables.

Still another object of this invention is to provide a generator of an arbitrary function of two variables wherein the function is defined by discrete voltage-carrying conductive elements.

A further object of this invention is to provide a generator of an arbitrary function of two variables wherein the independent voltages defining said function may readily be varied.

A still further object of this invention is to provide a generator of an arbitrary function of two variables wherein the independent voltages defining said function may be supplied automatically by punched card techniques.

Another object of this invention is to provide a novel arbitrary function signal generator wherein a plurality of independent voltages defining a plurality of independent functions of one variable may be funished simultaneously.

Another object of this invention is to provide an arbitrary function signal generator wherein a smooth output voltage transition may be interpolated between said independent, function-defining voltages.

Still another object of this invention is to provide an accurate, simple, flexible generator of voltages representing either an arbitrary function of two variables, or a plurality of arbitrary functions of one variable.

Briefly, the objects of this invention are attained by providing a two-dimensional array of electrically conductive elements insulated from one another, with voltages applied to the elements from an individually adjustable voltage source.

The voltage on each element may be adjusted to a desired magnitude and polarity corresponding to an arbitrary function of two variables, $x$ and $y$, at the particular values of $x$ and $y$ corresponding to the position of the element in the two dimensional array. By means of a pickoff, which may be traversed in two dimensions by a suitable servo system, a smooth transition of the output signal from one discrete voltage-carrying element to another may be obtained. Thus, it may be seen that as the servo system traverses the pickoff across the voltage-carrying array of elements in accordance with the desired range of values of $x$ and $y$, an output signal voltage is obtained from said pickoff which varies in accordance with the arbitrary function of $x$ and $y$ predetermined by the discrete voltage magnitudes previously applied to the elements by said voltage sources. By means of a simple modification, disclosed in detail hereinbelow, a signal generator may be constructed according to the principle of this invention to simultaneously generate a plurality of signal voltages, each representing a function of one variable. Instead of a single pickoff translatable in two dimensions, as mentioned hereinbefore, a plurality of suitably modified pickoffs are provided, each being translatable in only one dimension. Voltages representing an arbitrary function of a single variable are impressed upon a single row of elements in the two dimensional array. Thus, it may be seen that by impressing voltages representing an individual function on each row of studs, and traversing an individual pick-off across each row, a number of independent functions of one variable may be generated simultaneously. Additionally, the present invention includes means for instantaneously and automatically setting up function-representing voltages on the array of studs. Voltages representing either an arbitrary single-valued function of two variables, or a plurality of arbitrary single-valued functions of one variable may be applied to the array of stud elements by means of an automatic punched-card reading mechanism.

The invention may be more fully understood by reference to the following detailed description and appended drawings, wherein:

Figure 1 illustrates one embodiment of this invention,

Figure 2 illustrates certain deails of the embodiment of Figure 1, together with a voltage supply, Figure 3 illustrates a preferred embodiment of the pickoff to be used with the apparatus of Figures 1 and 2.

Figure 4 illustrates automatic means employing a punched card for supplying function-representing voltages to the signal generator illustrated by Figure 1, Figure 5 shows the punched card utilized in the function-representing voltage supply means of Figure 4, Figure 6 illustrates one function of the class generated by the embodiment of Figure 1, and Figure 7 illustrates another embodiment of the present invention wherein a plurality of signals representing individual arbitrary functions of one variable may be generated simultaneously.

Referring now to the drawings, and more particular to Figure 1 thereof, a table or base 12, fabricated of a suitable insulating material, is therein depicted. An array of electrically conductive studs or pin elements 13 are embedded in table 12 in a suitable manner so that only the tips thereof protrude above the surface of table 12 in the manner more clearly illustrated by the cross-section view in Figure 2. An individual voltage is applied to each stud 13 by means of a suitable voltage supply means 18. A card-like interpolating pickoff 15 is traversed across table 12 in conductive contact with studs 13 by means of a suitable servo system, the detail construction of which forms no part of this invention. Illustratively, a suitable servo system adapted for traversing the pickoff 14 longitudinally includes a reversible servo motor 15 driving lead screw 16. One end of lead screw 16 is fixedly attached to the rotor of servo motor 15, and other end being supported by a bearing 17, thereby allowing lead screw 16 to be freely rotated. A pulley 22, mounted on lead screw 16 and rotated thereby, drives a pulley 23, fixedly attached to, and rotating a second lead screw 24 in synchronism with lead screw 16, by means of an endless flexible cable 25 cooperating with said pulleys. Lead screw 24 is supported, in a manner enabling free rotation, by means of a bearing 26 at one extremity, and a bearing 27 at the other extremity. An internally threaded block 31, suitably restrained against rotation in the manner disclosed hereinbelow, is mounted upon lead screw 16 in such a manner as to be translated along lead screw 16 as lead screw 16 is rotated by servo motor 15. A similar internally threaded block 32, restrained in a similar manner against rotation, is mounted upon lead screw 24 in a manner allowing block 32 to be translated as lead screw 24 is rotated. Lead screws 16 and 24, connected by a flexible, endless cable 25 cooperating with pulleys 22 and 23, are thereby rotated in synchronism by servo motor 15, thus moving threaded blocks 31 and 32 in synchronism longitudinally. A transverse beam 36, securely fastened to threaded blocks 31 and 32, maintains blocks 31 and 32 in fixed relation to one another, and prevents rotation thereof as associated lead screws 16 and 24 are rotated. Rotation of said lead screws 16 and 24 imparts a translatory motion to blocks 31 and 32, thereby traversing beam 36 longitudinally. Fixedly mounted to block 32 is a second servo motor 33, arranged to rotate lead screw 34. A suitable bearing 38 is provided, mounted upon internally threaded block 31, to support one end of lead screw 34 for relative rotation. The other end of lead screw 34 is fixed to the rotor of servo motor 33, rotating therewith.

Pickoff support arm 35 is provided with an internally threaded, cylindrical portion cooperating with lead screw 34, thereby enabling transverse movement of pickoff 14 as lead screw 34 is rotated. As will be apparent, rotation of lead screw 34 tends to impart a twisting motion to pickoff support arm 35, one side of pickoff 14 being pressed against table 12 while the other side is lifted away, thus tending to break contact with studs 13. To prevent such undesirable twisting motions, the cylindrical portion of pickoff support 35 is furnished with a downwardly extending projection 39 cooperating with a groove in beam 36, in the manner illustrated more clearly in Figure 2.

Interpolating pickoff 14 is secured to pickoff support arm 35 in a suitable manner so as to be translatable therewith. Pickoff 14 is secured to support arm 35 in such a manner that the surface is parallel with the surface of table 12 and in contact with stud array 13. Function output lead 37 is suitably fastened to the center of pickoff card 14. The output function signal voltage from pickoff card 14 is applied to an operational amplifier 41, of a type well known to those skilled in the art, having a linear, resistive feedback loop 42. The output signal from amplifier 41 is furnished to output lead 43, which is connected to the desired utilization device, such as electronic analog computing equipment.

The electrical portion of the x-axis servo system for traversing pickoff 14 longitudinally includes a reversible servo motor 15, a servo amplifier 44, an input x-axis positioning signal lead 45, motor control leads 46, position feedback potentiometer 47, potentiometer slider 52 and position feedback leads 53. The feedback system provided for traversing pickoff card 14 laterally along the y-axis of table 12 includes, in addition to servo motor 33, a feedback servo amplifier 54 having an input y-axis positioning signal lead 55, motor control leads 56, a position feedback potentiometer 57, potentiometer slider 62 and position feedback leads 63.

As will be obvious to one skilled in the art, the pickoff traversing means disclosed herein merely represents one of the many possible configurations such systems may assume. Alternatively, pneumatic or hydraulic positioning means may be employed for traversing pickoff 14. Similarly, shafts or pulley devices may be utilized in place of the lead screws and threaded blocks described hereinabove. Means for traversing pickoff 14 in polar coordinates may alternatively be employed in connection with this invention. It will be apparent, therefore, that the specific pickoff traversing means described in detail hereinabove is merely illustrative of one possible configuration thereof and does not constitute any part of this invention.

Referring now to Figure 2, the structure of the arbitrary function signal generator of Figure 1 is shown in further detail. Internally threaded pickoff support arm 35 is laterally traversed by means of lead screw 34, illustrated herein in section. Mounted upon and insulated from support arm 34 is interpolating pickoff 14 and y-axis positioning potentiometer wiper 62. Transverse beam 36 is furnished with a guide slot, herein shown in section, adapted to cooperate with downwardly projecting extension 39 on the cylindrical portion of pickoff support arm 35, thereby preventing rotation of pickoff support arm 35 and pickoff 14 as lead screw 34 is rotated in the manner disclosed hereinabove.

Interpolating resistive pickoff 14 is mounted in sliding electrical contact with studs 13, which are mounted in table or base 12 in a two dimensional array. Each stud is individually connected to a voltage supply 18(a) by means of an individual conductor 65. Voltage supply 18(a) comprises a suitable voltage source, such as battery 66, connected to a common voltage bus 67. An individual potentiometer 68, provided for each stud 13, is connected to voltage source 66 through bus 67. Each potentiometer 68 is furnished with a manually adjustable slider 71, connected to stud 13 through lead 65. Thus, it may be seen that the voltage applied to each stud 13 may be varied individually by manually altering the position of slider 71 on potentiometer 68.

It will be apparent that many variations of the disclosed power supply 18(a) are possible, and are contemplated by this invention. Various types of electronic voltage sources, well known in the art, may be substituted for the battery 66, illustrated herein. Arrangements for furnishing either positive or negative voltages to studs 13 are also contemplated, such as providing both positive and negative sources of voltage and inserting a reversing switch in the potentiometer circuits to suitably cooperate with each potentiometer 68.

As will be apparent from examination of Figures 2 and 3, one preferred embodiment of pickoff 14 comprises a substantially square, homaloidal, member fashioned of an appropriate resistive material, having an output lead 37 conductively secured in a suitable manner to the center thereof. The pickoff 14 illustrated in Figure 3 simultaneously contacts a square group of nine studs 13, which comprise a selected portion of the array chosen by signals applied to the x- and y-axis servo systems. As pickoff 14 is traversed by the servo sysem along a single axis, as for example, from left to right in Figure 3, pickoff 14 is so dimensioned as to break contact with the three studs adjacent the left edge of the pickoff before contact is made with the three studs to the right of the pickoff. Thus, as the resistive pickoff is traversed from left ot right, it will successively be in contact with nine studs, then six studs, and then again nine studs, thereby resulting in an interpolating action to be more fully disclosed hereinbelow.

It may become desirable to apply the function-reproducing voltages to studs 13 automatically, particularly when certain functions are to be frequently used. Such automatic voltage applying means are illustrated by Figures 4 and 5 comprising voltage supply 18(b). In Figure 5, a portion of the eighty columns of a punch card 72 are illustrated, the punching stations thereon identified in a manner to be explained hereinbelow. The indicia illustrated enable either a positive or negative potential ranging from 0.1 to 100 volts to be provided to each of the studs 13 mounted on table 12. Referring to Figure 4, a punched card 72, illustrated as having the first column thereof punched to enable a positive potential of 25 volts to be provided to an individual stud 13, is held in a suitable card holder 73, formed of a conductive material, having aligning walls 81. A platen 74, fabricated of an insulating material, contains twelve sensing fingers, such as 75, cooperating with each one of the eighty columns included on punch card 72. Each sensing finger 75 is connected to a resistor, such as 76, which form, in combination, a voltage summing circuit. A positive potential, for example 100 volts, is applied to conductive card holder 73 by a suitable voltage source 77, and a negative potential of 100 volts is supplied directly to the voltage summing network by a voltage source 78 through another summing resistor 81. The algebraic sum of the voltages applied to the voltage summing network is furnished to one of the studs 13 in table 12 by means of conductor 65. With pickoff 14 in contact with a number of said studs in the manner disclosed hereinabove, conductor 37 furnishes the function representing voltage to feedback operational amplifier 41, which has an amplification characteristic much greater than one. The function-representing voltage is then delivered to the desired utilization device over output lead 43.

A portion of a punch card of the type used in the card reader of Figure 4 is illustrated by Figure 5. As will be familiar to those skilled in the art, a well-known type of punch card provides twelve punching stations in each one of eighty columns. Various combinations and permutations of the twelve punching stations may be selected to enable the desired range of discrete, function-defining voltages to be applied to each stud 13.

The particular indicia illustrated on punch card 72 in Figure 5 represent a modified binary progression. The indicia from ".1" to "6.4" are arranged in a conventional binary manner. A second binary group in the twelve stations follows, commencing with "10" and proceeding to "80." By punching various combinations of these indicia, any value between 0 and 100, in steps of 0.1, may be indicated. Thus, by punching the ".2," "1.6," "3.2" and "20" stations, illustrated by the punchings in the left-hand column of card 72 in Figure 5, the value "25" is indicated. The punching of the "+" station indicates that a positive voltage is to be applied to stud 13. Negative voltages may be furnished by subtracting the desired value from 100, and punching the necessary indicia representing the difference between 100 and the desired negative voltage. In this case, the "+" station is not punched. Thus, if it is desired to apply a —40 volts to a stud, only the "40" and "20" indicia in the proper column are punched, thereby adding algebraically —100 volts and +60 volts, in the manner to be described hereinbelow. Since one column is used to control the voltage applied to one stud, a single punch card may be used to control the function-defining voltages applied to eighty studs. Several card readers, of the type disclosed hereinabove in connection with Figure 4, may be used simultaneously to translate the punches on several cards to the desired function-defining voltages applied to an array of studs, which may include as many individual studs as may be desired to generate a particular function. In the embodiment illustrated herein by Figure 1, an array of 289 studs is provided, arranged in seventeen rows containing seventeen studs in each row. Such an array requires the perforations in four punched cards to be translated simultaneously in four card readers of the type disclosed hereinabove, in order to apply a distinct, function-defining voltage for each stud.

The array of studs disclosed herein is merely illustrative of one possible grouping contemplated by this invention. As will appear obvious, any desired number of studs may be utilized in practicing this invention. Furthermore, instead of the rectangular array illustrated herein, a circular array of stud elements may be used in conjunction with a polar coordinate form of servo system, which is well known in the art.

An elementary function of the form capable of being represented by means of the embodiment of this invention disclosed hereinabove in connection with Figure 1 is illustrated by Figure 6. Here, voltages representing a portion of the function $z=a^2-x^2-y^2$ are applied to one row of studs, $13a$ to $13s$, in the array. This function represents the surface to be produced and the relative magnitude of the individual voltages applied to the elements are represented by the length of the projection, parallel to the $z$ axis from the base 12 to the surface, which in this case is a sphere. Since both positive and negative function-defining voltages cannot be applied simultaneously on the same stud, either the positive or negative values of $z$ are set up on the studs. In the example illustrated, the positive hemisphere is simulated, the origin of the $x$, $y$ and $z$ axes being arbitrarily placed at the stud $13j$. The section taken along the $x$ axis in Figure 6 reveals studs $13a$ to $13s$ embedded in base 12. By means of one of the voltage supplies disclosed hereinabove in connection with Figure 2 and Figure 4, the potentials representing $z=a^2-x^2-y^2$, wherein both $a$ and $y=0$, are applied to studs $13a$ to $13s$. In the voltage supply disclosed in connection with Figure 2, wiper arm $71a$ of potentiometer $68a$ is adjusted to provide a zero potential to stud $13a$. Wiper arm $71b$ of potentiometer $68b$ is arranged to furnish a potential of 41.2 volts to stud $13b$. Similarly, the remainder of the studs $13a$ to $13s$, arranged along the $x$ axis of the above function, are provided with potentials in accordance with the values set forth in the table below:

| Studs: | Potential (volts) |
|---|---|
| $13a$ | 0.0 |
| $13b$ | 41.2 |
| $13c$ | 56.6 |
| $13d$ | 67.0 |
| $13e$ | 74.9 |
| $13f$ | 80.7 |
| $13g$ | 84.8 |
| $13h$ | 88.0 |
| $13i$ | 89.1 |
| $13j$ | 90.0 |
| $13k$ | 89.1 |
| $13l$ | 88.0 |
| $13m$ | 84.8 |
| $13n$ | 80.7 |
| $13o$ | 74.9 |
| $13p$ | 67.0 |
| $13q$ | 56.6 |
| $13r$ | 41.2 |
| $13s$ | 0.0 |

Function-defining voltages for the values $y=\pm 1$, $y=\pm 2$, $y=\pm 3$, etc., are similarly set up by adjusting the proper wipers 71 to tap off the required voltages from their respective potentiometers 68 and applying these voltages to the elements 13 associated with said potentiometers 68. Thus, it may be seen that these discrete voltages serve to define the surface of an arbitrary, single-valued function of two variables.

The magnitude of the voltages present on the conductive elements 13 define the surface of the desired function. But since the surface of the function is defined by a discrete number of individual voltages rather than one continuous voltage, the interpolating voltage pickoff 14 is provided to produce a smooth output voltage signal. Interpolating pickoff 14 enables a smooth transition in voltage from point to point as the pickoff is traversed across the array of studs 13, by servo motors 15 and 33. As described hereinbefore, pickoff 14 is moved in accordance with $x$ and $y$ positioning input signals applied to input leads 45 and 55 of servo amplifiers 44 and 54. A preferred embodiment of interpolating pickoff 14 is illustrated by Figure 3 and comprises a square, homaloidal, card-like body formed of a suitable homogeneous resistive material. An output conductor 37 is connected to the center of pickoff 14 in an appropriate manner. The type material forming pickoff 14 and the thickness thereof are so chosen as to provide a high resistance per unit area in comparison to the internal resistance of voltage supply 18. Hence, the loading effect of pickoff 14 on voltage supply 18 is minimized.

As pickoff 14 is traversed across studs 13, a variable resistance voltage divider action takes place. For example, if pickoff 14 simultaneously contacts studs $13c$, $13d$, and $13e$, the resistance presented by pickoff 14 to studs $13c$ and $13e$ will be very high, while the resistance presented to stud $13d$ will be very low. This condition arises because lead 37 is conductively fastened to the center of pickoff 14 and thereby presents an extremely short low resistance path of resistive material to operational amplifier 41. Thus, it may be seen that the potential appearing on lead 37 will be substantially determined by the voltage present on stud $13d$, which, in the example illustrated hereinabove in connection with Figure 6, is 67.0 volts. However, as the center of pickoff 14 is moved away from stud $13d$ toward stud $13e$, a variable resistance voltage divider action takes place. The path of high resistance material between stud $13d$ and the point of connection of output lead 37 to pickoff 14 increases, and the path of high resistance material between the point of connection of output lead 37 and stud $13e$ decreases simultaneously. It may be seen, therefore, that the potential on lead 37 will vary smoothly from 67.0 volts, on stud $13d$, to 74.9 volts present on stud $13e$. The elementary example presented here illustrates the operation of pickoff 14 as it is traversed in the $x$ direction along but one row of studs. It will be apparent, however, that the interpolating action of pickoff 14 as it is traversed across a number of studs along the $y$ axis, or across a number of studs along both the $x$ and $y$ axis simultaneously, is performed in a manner similar to the elementary example disclosed hereinabove. Therefore, it will be apparent that resistive pickoff 14 interpolates a smooth change in output voltage between the discrete function-defining voltages present on studs 13, and thus provides an output voltage on lead 37 which closely reproduces the arbitrary function of two variables.

Providing the voltages for an array including 289 studs, as illustrated by Figure 1, by manually adjusting each wiper 71 of each potentiometer 68 individually, may be very time consuming. Hence, it has been found advantageous to provide a rapid, automatic means for providing function-defining voltages to the array of studs 13. An embodiment of the automatic voltage means contemplated by this invention is illustrated by Figure 4 and utilizes a punch card of the type illustrated by Figure 5.

This device comprises voltage supply 18(b) and allows function representing voltages to be simultaneously set up on an array of several hundred studs substantially instantaneously. Of the eighty columns on a conventional punch card, one column is utilized for controlling the potential applied to a single stud. By providing means for reading four punched cards concurrently, it is possible to set up function-defining voltages on all of the 289 studs in the array illustrated by Figure 1 substantially simultaneously.

A portion of a conventional punch card is illustrated by Figure 5. Normally, a total of twelve punching positions are available in each column. The indicia appearing in each column of card 72 in Figure 5 are illustrative of a modified binary progression and suitable combinations thereof provide a range of either positive or negative values from 0.1 to 100 in steps of 0.1. By punching the desired combination of punching stations in each column, a graduation of positive or negative voltages ranging from 0.1 volt to 100 volts may then be produced by a card reader to be described hereinafter and applied to each of the studs 13. The card reader serves to produce a voltage corresponding in magnitude to the additive combination of punched stations in each column, which is then applied to studs 13. For example, from the first column of the card illustrated in Figure 5, the card reader would furnish a positive 25 volt potential to an associated stud 13. The 25 volt signal is derived by adding .2, 1.6, 3.2 and 20 as indicated by the punched stations in the card.

A schematic diagram of a card reader, illustrated by a cross-section taken at the reading position for column 1 of punch card 72, suitable for translating holes punched in card 72, is illustrated by Figure 4. The card reader includes a base plate 73 fabricated of a suitable conductive material and arranged in a suitable manner to support card 72 in proper relationship to sensing brushes 75. Formed of a suitable resilient, conductive material, such as phosphor bronze, the sensing end of brushes 75 may have a substantially J shape, which allows conformation to the thickness of card 72 at stations where no holes are punched, but provides electrical contact with base plate 73 at those card stations which are punched. An individual sensing brush 75 is provided for each of the twelve sensing stations in each of the eighty columns of punch card 72, thereby requiring a total of 960 sensing brushes for each card. Sensing brushes 75 are supported in platen 74, which is constructed of some suitable insulating material. Platen 74 may be raised and lowered by suitable means, not shown, but of a type well-known to those skilled in the art and thereby allows cards punched for different functions to be interchanged in the card reader. Card 72 and platen 74 are maintained by walls 81 in cooperative, aligned relationship as the punches on card 72 are sensed. Walls 81 may be integrally formed with base 73 and are placed so as to provide a close running fit around the perimeter of card 72 and platen 74, thereby restricting sidewise movement and allowing only the proper card stations to be sensed by cooperating brushes 75.

A positive voltage supply 77 is furnished to apply a constant positive potential of, for example, 100 volts to conductive base 73. A second voltage source 78 is furnished to apply a constant negative potential of the same magnitude, 100 volts, to a summing circuit comprising resistor 82, a bank of value resistors 76, conductor 65, stud 13, conductor 37, and feedback amplifier 41. The ohmic values of each of the resistors 76 and resistor 82 are suitably selected to provide a conventional summing network for developing the proper voltage magnitudes as are determined by the holes punched in one column of card 72. The voltages developed by the summing network are applied to an individual stud 13 corresponding to that column over conductor 65.

The particular resistor of resistor bank 76 associated with that position corresponding to card punching station "+" has an ohmic value chosen to equal the resistance of resistor 82. The remainder of the group of resistors 76, corresponding to punching stations "80" to "1," have resistance values inversely proportional to the respective indicia values and lower than the resistor associated with the "+" station. Thus, it may be seen that the group of resistors 76 and resistor 82 form a summing network which multiples the summed voltages by modified binary, fractional coefficients. An individual function-defining voltage is applied to each of studs 13 by an individual summing network identical to that disclosed above, each summing network being controlled by the apertures punched into a single column of a punch card 72.

Studs 13 and insulating table 12 are arranged in a manner similar to that disclosed in connection with Figure 1. Interpolating pickoff 14, shown schematically in Figure 4, is traversed across table 12 by a suitable servo system (not shown) in a manner similar to that disclosed hereinabove in connection with Figure 1. The function-defining voltage obtained by interpolating pickoff 14 from studs 13 is applied over conductor 37 to a feedback operational amplifier 41, having a linear resistive feedback loop 42. The high gain operational amplifier 41 by presenting a high-impedance load to pickoff 14, serves to deliver a faithful reproduction of the function defined by the voltage carried by studs 13 to the desired utilization apparatus.

The function-defining voltages applied to studs 13 by the voltage supply 78 illustrated by Figure 4 is determined by the apertures previously recorded in punch card 72 by suitable card-punching means, well known in the art, and forming no part of this invention. The apertures in punched card 72 allow the positive voltage, supplied to conductive plate 73 by voltage supply 77, to be applied through the punched apertures in card 72 to brushes 75, and to the summing network including resistors 76. The summing networks multiply the voltages applied to the input by the desired fractional coefficients in a manner well known to those skilled in the art. Thus, if it is desired to apply a positive potential of ten volts to the stud 13 corresponding to column 1 of punch card 72, the punching stations marked "10" and "+" are punched. The card is then placed on base 73, and platen 74 is lowered. The negative potential of 100 volts applied to the summing network by voltage source 78 is opposed and neutralized by the positive potential supplied by the brush 75 at the "+" indicia on punch card 72. Resistor 82 and the particular resistor of group 76 associated with the "+" indicia on card 72 are chosen to be equal and each resistor is also equal to the resistance of feedback circuit 42 of operational amplifier 41. The resistor of group 76 associated with the indicia marked "10" on card 72 is chosen to have a resistance ten times the resistance of feedback loop 42. Thus, it may be seen that one-tenth of the voltage supplied by source 77 is applied to stud 13. As disclosed hereinabove, the voltage applied through the "+" indicia serves to cancel out the negative voltage supplied by source 78. Resistive pickoff 14 serves to introduce a varying resistance voltage divider in circuit with conductor 37, connected to operational amplifier 41. Thus, when the edge of pickoff 14 initially contacts a stud 13, the high resistance of pickoff 14 between the edge and conductor 37, which is connected at its center, decreases until the stud is at the center, whereupon substantially zero resistance is presented to the circuit between stud 13 and conductor 37. Since several studs of the array are simultaneously in contact with pickoff 14, the voltage appearing on the stud 13 closest to the center substantially determines the voltage appearing on lead 37, in the manner disclosed more fully hereinabove in connection with Figure 2. As stated hereinbefore, pickoff 14 is designed and constructed to contact a plurality of studs in the array and is traversed in both the $x$ and $y$ directions by the servo mechanism. Thus, a continuous voltage representing an arbitrary function of two variables is presented to the desired utilization equipment by operation amplifier 41.

A function generator constructed according to this invention may be modified in the manner illustrated by Figure 7 to enable simultaneous generation of a plurality of voltages, each representing an individual arbitrary function of one variable. In this embodiment, pickoff 14 and the associated y axis servo traversing means on transverse beam 36 are replaced by a plurality of individual pickoff 83 fixedly attached to transverse beam 36. As shown, each individual pickoff 83 cooperates with but a single row of studs 13. Additionally illustrated are a portion of table 12 containing stud elements 13, lead screw 24, position feedback potentiometer 47, and potentiometer pickoff 52, which comprises a portion of the x-axis-traversing servo system. The remainder of the x-axis-traversing servo system including the control amplifier are not shown in Figure 7, but are substantially similar in structure to the x-axis servo system disclosed hereinabove in connection with Figure 1.

Each pickoff 83, which cooperates with a single row of studs 13 along the x axis of table 12, is fabricated of a suitable electrically resistive material, similar to the material utilized for pickoff 14. However, instead of the substantially square configuration, an elongated, homaloidal shape may be utilized.

A conductor 84, suitably fastened to the center of pickoff 83, furnishes the function-representing voltage signal to a high gain feedback operational amplifier 41, in a fashion similar to that disclosed hereinabove in connection with Figures 1 and 3. As a result of the elongated configuration thereof, pickoff 83 is adapted to contact three of the studs 13 in a single row simultaneously when pickoff 83 is positioned so that one stud is in contact with the center, and a single stud is in contact with each end. As beam 36 is traversed along the array of studs 13 by the x-axis servo system, each pickoff 83 breaks contact with one stud but remains in contact with the other two studs. As the center of the pickoff is traversed from the stud previously in contact therewith and approaches a second stud, a fourth stud in each row is contacted by the leading edge of each pickoff 83. Thus, it will be apparent that pickoff 83 functions in a similar manner to pickoff 14 disclosed hereinabove. A high resistance is inserted in circuit with those studs in contact with one or the other ends of pickoff 83, decreasing linearly to substantially zero resistance when the stud 13 is in contact with the center of pickoff 83, where conductor 84 is connected to pickoff 83.

Discrete, function-defining voltages are applied to conductive elements 13 by means of a suitable multiple voltage source 18, which may be of the type described in connection with either Figure 2 or Figure 4. The individual, function-defining voltage level applied to each stud 13 is predetermined from the function to be simulated in the manner disclosed in connection with Figure 6. In voltage source 18(a), illustrated by Figure 2, the wipers 71 of potentiometers 68 are manually adjusted to tap off the desired potential from voltage source 66. The function-representing volt..ge tapped from potentiometers 68 by wipers 71 is applied to the proper stud 13 in the required row. The desired function of one variable is thus defined along the row of studs 13 by an individual voltage level on each stud. Several rows of studs 13, with each row having impressed thereupon voltages representing an individual function of one variable, are traversed simultaneously by individual pickoffs 83. The traversing signal applied to x-axis servo amplifier 44, in addition to a signal from wiper 52 of position potentiometer 47, causes x-axis servo motor 15 to rotate lead screws 16 and 24, thereby traversing threaded blocks 31 and 32 and transverse beam 36 mounted thereupon. It may be seen therefore, that the interpolating pickoffs 83 each traverse a single row of studs 13, upon which have been impressed the discrete voltages defining the desired arbitrary function of one variable. Each pickoff 83 interpolates a smooth transition between the function defining voltages set up on studs 13 and furnishes the desired arbitrary function output voltage over conductor 84 through its associated amplifier 41 to the desired utilization equipment.

The automatic punch card controlled voltage supply source, 18(b), described hereinabove in connection with Figure 4, may be employed to furnish function-defining voltages to the embodiment of this invention illustrated in Figure 7. Each column of punch card 72 is punched to determine the voltage to be applied to an individual stud 13, in the manner disclosed hereinabove. Thus, one punch card containing eighty columns may be utilized to furnish voltages defining an independent function to each of four rows containing seventeen studs each. Inasmuch as punched cards 72 are readily interchanged in the card reader disclosed hereinabove and may be reused many times, a great deal of the time and labor required to individually adjust potentiometers 68 for a desired function may be avoided.

It will be apparent from the foregoing that a novel and useful signal generator has been disclosed which is capable of generating an output voltage representing a single-valued arbitrary function of two independent variables of the form $z=f(x,y)$. An individually adjustable, function defining voltage is applied to each one of an array of conductive elements wherein each element represents a particular value of $x$ and $y$. A pickoff, which is arranged to contact a plurality of conductive elements simultaneously, is associated with a servo system, of a type well known in the art, which traverses the pickoff across the array of conductive elements in accordance with positioning voltages applied thereto. These positioning voltages represent the desired values of $x$ and $y$. As the pickoff is traversed across the individual conductive elements, each bearing an individual function-defining voltage, the variable resistance, voltage divider action of the pickoff serves to interpolate a smooth output voltage between the discrete function-defining voltages applied to the conductive elements. The output signal from the pickoff is then passed through a linear, high gain feedback operational amplifier, which serves only to avoid the undesirable effects of loading. Output signals from the operational amplifier, representing the desired function of the type $z=f(x,y)$, are then furnished to the desired utilization apparatus.

Individual function-defining voltages may be applied to the conductive element array by means of a suitable multiple voltage source. One such voltage source includes a plurality of potentiometers connected to a suitable power source, one of said potentiometers being supplied for each conductive element. Each potentiometer includes a manually adjustable wiper connected to the conductive element associated therewith, arranged in a manner enabling the desired potential to be tapped off said potentiometer and applied to the conductive element associated therewith.

Another arrangement for supplying function-defining voltages to each conductive element is also disclosed. In this arrangement a voltage summing network is provided for each conductive element. The value of each resistor in the network is chosen to multiply a common input voltage by a constant, fractional coefficient. A conventional punched card is provided to select resistors representing the desired coefficients. Each column of the card is punched to control the connection of the desired resistors of a summing network to a voltage source. The perforations of each column of the card are sensed by a suitable card reader, which provides a predetermined function-defining voltage to each conductive element.

In accordance with the principles of this invention a second embodiment describes a device for simultaneously producing a plurality of signal voltages, each representing an arbitrary function of a single variable. Individual voltages, each defining a function of one variable, are applied to a single row of conductive elements. Either of the voltage supply means, described hereinabove, may be employed to supply the function-defining voltages to the array of conductive elements in this embodiment. Individual pickoffs cooperate with each row of conductive elements, and individual output means are provided for each pickoff. In this modification only an x-axis traversing servo mechanism is required, which serves to traverse each of the plurality of interpolating pickoffs across each row of conductive elements simultaneously.

While certain preferred embodiments of the invention have been specifically disclosed, it is understood that the invention is not limited thereto as many variations will be readily apparent to those skilled in the art and the invention is to be given its broadest possible interpretation within the terms of the following claims:

What we claim is:

1. An arbitrary function signal generator comprising an array of discrete conductive points maintained in spaced relationship by a supporting base, a voltage supply comprising an algebraic sum of voltages of opposite polarities and of varied magnitudes connected to each point of said array to provide potentials defining a function to said conductive points, a resistive pickoff member superimposed upon a plurality of said points, means for providing relative movement between said pickoff and said points, and output circuit means connected to said pickoff to produce a signal voltage representing an arbitrary function.

2. An arbitrary function signal generator, comprising an array of conductive elements maintained in spaced relationship by a supporting base, a voltage supply for providing potentials to said conductive elements corresponding to the magnitude of a predetermined function, said voltage supply including a voltage source and adjustable voltage selecting means connected with said source and associated with each element of said array to produce a range of function defining potentials to said elements, a movable pickoff member for interpolating between successive potentials applied to said elements, said member including a resistive element positioned in conductive relation with a pattern of successive conductive elements of said array, means for moving said pickoff relative to said elements, and output circuit means connected to said pickoff to produce a signal representing a desired function.

3. An arbitrary function signal generator comprising an array of conductive pins maintained in spaced relationship by a supporting base, a voltage source for providing potentials to said conductive pins corresponding to the magnitude of a predetermined function, a pickoff member for interpolating between potentials applied to successive pins, said member including a resistive element supported in conductive relation with a pattern of successive pins of said array and arranged to produce an output in accordance with the position of said pattern of pins with respect to a fixed point on said resistive element, means for moving said pickoff relative to said pins, and output circuit means connected to said pickoff to produce a signal representing a desired function.

4. An arbitrary function signal generator, comprising an orthogonal array of conductive elements maintained in spaced relationship by a supporting base, a voltage source for providing potentials to said conductive elements corresponding to the magnitude of a predetermined function, a pickoff member for interpolating between potentials applied to successive elements, said member including a resistive element supported in conductive relation with a pattern of successive elements of said array and arranged to produce an output in accordance with the position of said pattern of elements with respect to a fixed point on said resistive element, means responsive to a signal representing one variable of a function for moving said pickoff member in one direction, means responsive to a signal representing another variable of said function for moving said pickoff member in another direction, and output circuit means connected to said pickoff to produce a signal representing a desired function.

5. An arbitrary function signal generator, comprising an array of discrete conductive points maintained in spaced relationship by a supporting base, a voltage supply for providing potentials to said conductive points corresponding to the magnitude of a predetermined function, said voltage supply comprising a summing network including resistors having predetermined resistance ratios, a source of voltage, and means for selectively connecting different resistor combinations to said voltage source to provide a selected potential to said conductive points, a movable pickoff member for interpolating between successive potentials applied to said points, said member including a resistive element positioned in conductive relation with a pattern of successive conductive points of said array, means for moving said pickoff relative to said points, and output circuit means connected to said pickoff to produce a signal representing a desired function.

6. An arbitrary function signal generator, comprising an array of conductive elements maintained in spaced relationship by a supporting base, a voltage supply for providing potentials to said conductive elements corresponding to the magnitude of a predetermined function, said voltage supply comprising a summing network including resistors having predetermined resistance ratios, a source of voltage, and selection means for selectively connecting different resistor combinations to said voltage source, said selection means including a record perforated in accordance with selected function defining potentials and perforation sensing means associated with said record for interconnecting different resistors to said voltage source in accordance with said record, a movable pickoff member for interpolating between successive potentials applied to said elements, said member including a resistive element positioned adjacent a pattern of successive conductive elements of said array, means for moving said pickoff relative to said elements, and output circuit means connected to said pickoff to produce a signal representing a desired function.

7. In an arbitrary function signal generator, the combination of: a supporting base of electrical insulating material, a rectangular array of conductive elements arranged in two dimensions and maintained in spaced relationship by said base, a voltage supply adapted to provide potentials defining said function to said conductive elements including a common voltage source, a multiplicity of resistors connected to said voltage source, and adjustable voltage selecting means associated with said resistors whereby the potential provided said elements may be selected to define said function, a pickoff comprising a homaloidal member of resistive material having a rectangular configuration adapted to simultaneously contact a two-dimensional group of said elements, means responsive to a signal representing a first variable of said function for translating said pickoff in a first dimension relative to said elements, means responsive to a second variable of said function for translating said pickoff in a second dimension relative to said elements, and output circuit means connected to said pickoff whereby a signal voltage representing said arbitrary function is generated.

8. A multiple function signal generator comprising an array of conductive elements arranged in rows and maintained in spaced relationship by a supporting base, a voltage supply providing potentials to each row of conductive elements corresponding to the magnitude of a predetermined function, said voltage supply comprising a summing network associated with each of said conductive elements including a multiplicity of resistors having predetermined resistance ratios, an input terminal associated with each of said resistors, summing network output means connected to one of said conductive elements, a voltage source, and means enabling selective connection of said resistors to said voltage source, whereby a voltage corresponding to the magnitude of said predetermined function is applied to a conductive element, a plurality of movable pickoff members, each comprising a homaloidal member of resistive material superimposed over a plurality of said conductive elements in each row, means for providing relative movement between said pickoffs and elements of each row, and output circuit means connected to said pickoffs whereby a plurality of signal voltages representing the desired functions are generated simultaneously.

9. A multiple function signal generator comprising an array of conductive elements arranged in rows and maintained in spaced relationship by a supporting base, a voltage supply providing potentials to each row of conductive elements corresponding to the magnitude of a predetermined function, said voltage supply including a selectively perforated record card, card retaining means comprising a substantially planar conductive body, a first source of voltage connected to said conductive body, record card sensing means including a plurality of sensing elements of conductive material adapted to contact said conductive body through said selectively perforated record card, a summing network comprising a plurality of resistors connected to said sensing elements, said plurality of resistors having predetermined resistance ratios whereby a voltage from said first source is multiplied by predetermined fractional coefficients, a second source of voltage connected to said summing network in a polarity opposed to said first source of voltage, a terminal common to said plurality of resistors and connected to a conductive elements of said array, whereby said selectively perforated record card enables said first source of voltage to energize selected resistors of said summing network in a polarity opposed to said second source of voltage and provide a selected polarity and potential to said conductive element, a plurality of movable pickoff members, each comprising a homaloidal member of resistive material superimposed over a plurality of said conductive elements in each row, means for providing relative movement between said pickoffs and elements of each row, and output circuit means connected to said pickoffs whereby a plurality of signal voltages representing the desired functions are generated simultaneously.

10. A multiple potential voltage supply including a selectively perforated record card, card retaining means comprising a substantially planar unity conductive body, a voltage source connected to said conductive body, record card sensing means including a plurality of sensing elements of conductive material adapted to contact said conductive body through said selectively perforated record card, a summing network comprising a plurality of resistors individually connected to said sensing elements, said plurality of resistors having predetermined resistance ratios whereby a voltage from said source is multiplied by predetermined fractional coefficients, an output terminal common to said plurality of resistors and a second voltage source of opposite polarity connected to said output terminal.

11. A multiple potential voltage supply including a selectively perforated record card, card retaining means comprising a substantially planar conductive body, a first voltage source connected to said conductive body, record card sensing means including a plurality of sensing elements of conductive material adapted to contact said conductive body through said selectively perforated record card, a summing network comprising a plurality of resistors individually connected to said sensing elements, said plurality of resistors having predetermined resistance ratios whereby a voltage from said first source is multiplied by predetermined fractional coefficients, a second source of voltage connected to an additional resistor of said summing network in opposed polarity to said first source of voltage, and an output terminal common to said plurality of resistors, whereby said selectively perforated record card enables said first source of voltage to energize selected resistors of said summing network in a polarity opposed to said second source of voltage and thereby provide a selected polarity and potential.

References Cited in the file of this patent

UNITED STATES PATENTS

| | | |
|---|---|---|
| 1,862,487 | Wensley | June 7, 1932 |
| 2,404,387 | Lovell et al. | July 23, 1946 |
| 2,556,972 | Murdick et al. | June 12, 1951 |
| 2,715,703 | Schuck | Aug. 16, 1955 |
| 2,774,934 | Gitzendanner | Dec. 18, 1956 |